United States Patent
Inokuchi et al.

(10) Patent No.: US 6,496,807 B1
(45) Date of Patent: Dec. 17, 2002

(54) RECORDING MEDIUM, RECORDING METHOD AND RECORDING APPARATUS INCORPORATING ANTI-TAMPER FEATURES INVOLVING WRITING BILLING INFORMATION INTO A WRITE-ONCE AREA

(75) Inventors: Tatsuya Inokuchi, Kanagawa (JP); Yoichiro Sako, Tokyo (JP); Masayuki Obata, Tokyo (JP); Shuichi Ito, Tokyo (JP); Kazuko Sakurai, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/394,658

(22) Filed: Sep. 13, 1999

(30) Foreign Application Priority Data

Sep. 22, 1998 (JP) .......................................... 10-268486

(51) Int. Cl.[7] .......................... G06F 17/60; G06K 19/06; H04K 1/00
(52) U.S. Cl. .............................. 705/64; 235/494; 705/51
(58) Field of Search ................................ 235/379, 454, 235/494, 492; 369/59.25; 705/1, 64–69, 51

(56) References Cited

U.S. PATENT DOCUMENTS 4,931,628 A * 6/1990 Wada .......................... 235/454
5,091,635 A * 2/1992 Akatsuka et al. ............ 235/494
5,930,217 A * 7/1999 Kayanuma ................ 369/59.25
6,029,887 A * 2/2000 Furuhashi et al. .......... 235/379

FOREIGN PATENT DOCUMENTS

| EP | 0430646 A2 | 6/1991 | ........... G07B/17/00 |
| EP | 0702286 A2 | 3/1996 | ............. G06F/1/00 |
| EP | 0942417 A2 | 9/1999 | ........... G11B/20/00 |

OTHER PUBLICATIONS

Patent Abstracts of Japan, JP 9–7039, Published Jan. 10, 1997.
Patent Abstracts of Japan, JP 1–113959, Published May 2, 1989.

* cited by examiner

Primary Examiner—James P. Trammell
Assistant Examiner—M. Huseman
(74) Attorney, Agent, or Firm—Oblon, Spivak, McClelland, Maier & Neustadt, P.C.

(57) ABSTRACT

A recording medium such as an optical disk has a write-once recording area in which information can be recorded once and cannot be rewritten. The write-once recording area is provided with a billing information recording area in which billing information is sequentially recorded a single time. With this arrangement, it is possible to effectively prevent the unauthorized use of the medium when carrying out off-line billing processing.

15 Claims, 6 Drawing Sheets

RECORDING MEDIUM, RECORDING METHOD AND RECORDING APPARATUS INCORPORATING ANTI-TAMPER FEATURES INVOLVING WRITING BILLING INFORMATION INTO A WRITE-ONCE AREA

BACKGROUND OF THE INVENTION

1. Field of the Invention

The present invention relates to a recording medium such as an optical disk or the like, a recording method using this recording medium and a recording apparatus using the same, and particularly to a technique using a recording medium which has a write-once recording area.

2. Description of the Related Art

Systems of billing transaction include on-line systems and off-line systems: on-line systems access a billing information management center by telephone or over a computer network, etc. to complete billing transactions, whereas off-line systems store billing information on a magnetic recording medium such as a telephone card or IC card, etc. to transact for billing off-line.

Off-line billing systems are already widespread as a prepaid card, etc. because they are simple in system structure and superior in mobility as compared with on-line systems.

Each of these off-line systems employs a rewritable recording medium to process for billing, so that there is some fear that the billing information may be falsified, causing considerable damage. For this reason, counter-measures have been proposed, such that the billing information recorded in the recording medium is enciphered, or a structure is incorporated that if anyone attempts to analyze recorded information by force the information is then destroyed. However, the actual situation is that no solution has been obtained because of problems of cost and convenience, and a vicious spiral between the security measures and rapid progress of deciphering techniques.

SUMMARY OF THE INVENTION

An object of the present invention is to prevent effectively the illegal use of off-line billing processing systems.

In order to achieve this object, the present invention employs for billing processing, a recording medium having the write-once recording area in which any information can be recorded, but the recorded information cannot be rewritten, and having a billing information recording area in which the billing information is sequentially recorded a single time in the write-once recording area.

The write-once recording area of the recording medium makes it impossible to erase any information that has been written into it. Therefore, providing the billing information recording area in the write-once recording area makes it difficult to wrongly (illegally or without authorization) use the billing information.

DESCRIPTION OF THE PREFERRED EMBODIMENTS

An embodiment of the present invention will be described below with reference to the accompanying drawings.

In the present embodiment, the present invention is applied to a recording medium having a write-once recording area in which recorded information cannot be rewritten. In this case, an optical disk referred to as a CD-R is used as the recording medium having the write-once recording area.

First, a recording format of the CD-R will be described. This format is described in a standard document called an orange book.

FIGS. 2A through 2D show the data structure on the CD-R.

Figure 2:
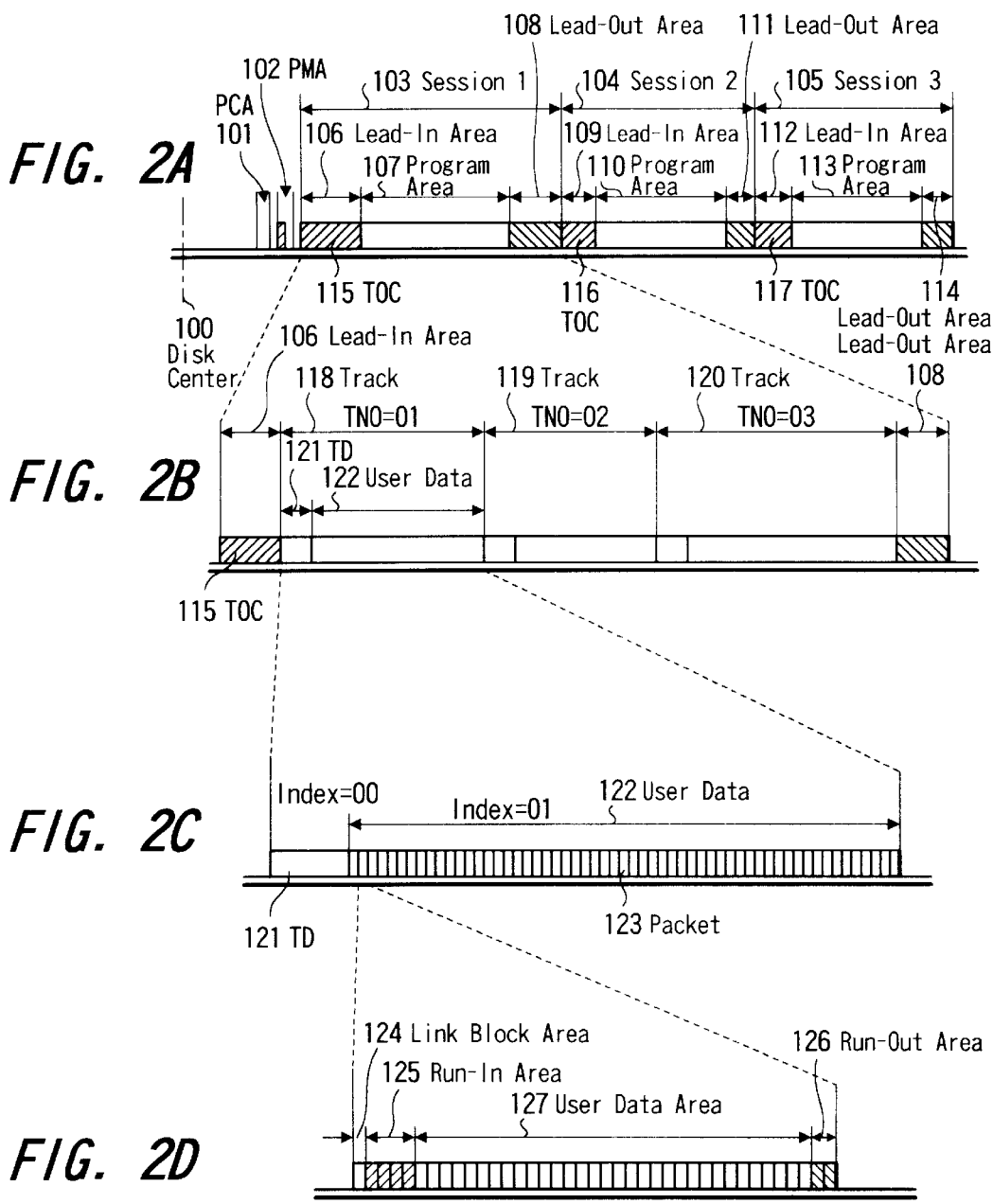
FIGS. 2A to 2D are each an explanatory diagram showing an example of data structure on the recording medium according to an embodiment of the present invention.

Referring to FIG. 2A, in the innermost peripheral portion close to a disk center 100 is a PCA (Power Calibration Area) 101 indicating a light quantity adjustment area. The PCA 101 has a test area for adjusting the light quantity of an optical beam during recording, and a count area for recording the state of use of the test area.

Adjacent the PCA 101 in the outer peripheral direction from the disk center 100 is a PMA (Program Memory Area) 102 indicating a program area. On this PMA 102 is recorded the state of use of the program area of CD-R. Specifically, start address information and end address information of data recorded at a track unit are recorded repeatedly a plurality of times.

Adjacent the PMA area in the outer peripheral direction from the disk center are a plurality of sessions 103, 104 and 105. The sessions 103, 104, 105 have in the outer peripheral direction from the disk center 100 the following areas: lead-in areas 106, 109, 112, respectively; program areas 107, 110, 113 respectively; and lead-out areas 108, 111, 114 respectively.

In the lead-in areas 106, 109, 112 are recorded data of index information of signals recorded in the program areas 107, 110, 113 as TOC (Table of Contents) 115, 116, 117 a plurality of times.

Sessions are recorded sequentially toward the outer periphery direction from the disk center 100. For example, the session 3 of 105 becomes recordable only when the lead-in and lead-out areas 109, 111 in the session 2 of 104 have been recorded to complete the session 2. At the same time, it becomes impossible to record additional information concerning session 2 of 104.

Specific contents of the TOCs 115, 116, 117 are as follows. The TOCs 115, 116, 117 begin at starting times of the lead-in areas 106, 109, 112, respectively. Within TOCs 115, 116, 117, each item is repeated three times. The completed TOCs 115, 116, 117 are repeated continuously within the lead-in areas 106, 109, 112.

In program areas 107, 110, 113 are recorded audio data and the like.

A data structure of session 103 is shown in FIG. 2B. The program area 107 is given track numbers (TNOs) depending on the number of recorded data, as shown in FIG. 2B. In this example, three data tracks 118,119,120 are provided in one session. Each of tracks 118, 119, 120 is made up of two areas distinguished by an index.

A data structure of track 118 is shown in FIG. 2C. The track 118 has, as shown in FIG. 2C, a TD (Track Descriptor) 121 for giving track information, and a packet 123 which is a data unit smaller than the track 118. Within the TD 121 also the same information is recorded a plurality of times.

Specific contents of TD 121 are as follows. The TD contains information on the track attribute of user data 122. The track attribute includes three kinds of track recording methods:

a track-at-once method (see FIG. 3), a fixed length packet method (see FIG. 5), a variable length packet method (see FIG. 4), and so on.

To write into the TD the same information is repeated for two or more seconds.

A data structure of packet 123 is shown in FIG. 2D. At the head of the packet 123 is a link block area 124. This link block area 124 connects a previous packet with a run-in area 125. This example shows the fixed length packet method in which a length of the packet is fixed.

Between the run-in area 125 and a run-out area 126 is sandwiched a user data area 127. These run-in area 125 and run-out area 126 are guard areas on which no data can be recorded.

Next, the recording method will be described.

Figure 3:
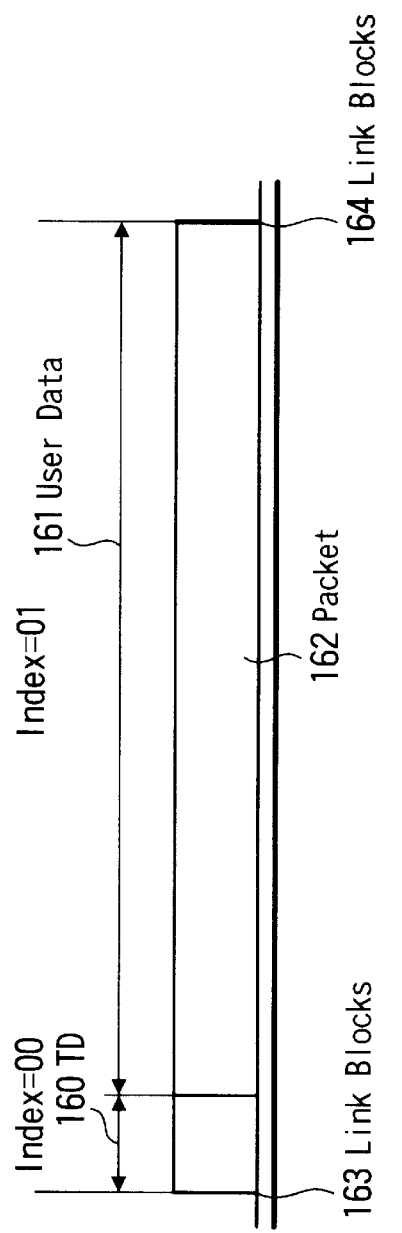
FIG. 3 is an explanatory diagram showing an example of data structure (of a packet by the track-at-once method) on the recording medium according to an embodiment of the present invention.

FIG. 3 shows the data structure of a packet according to the track-at-once method. An area whose index is "00" is a TD 160. In TD 160 is information indicating that a packet 162 is recorded using the track-at-once method. An area whose index is "01" is a recording area of user data 161. Link blocks 163 and 164 are buffer zones.

Figure 4:
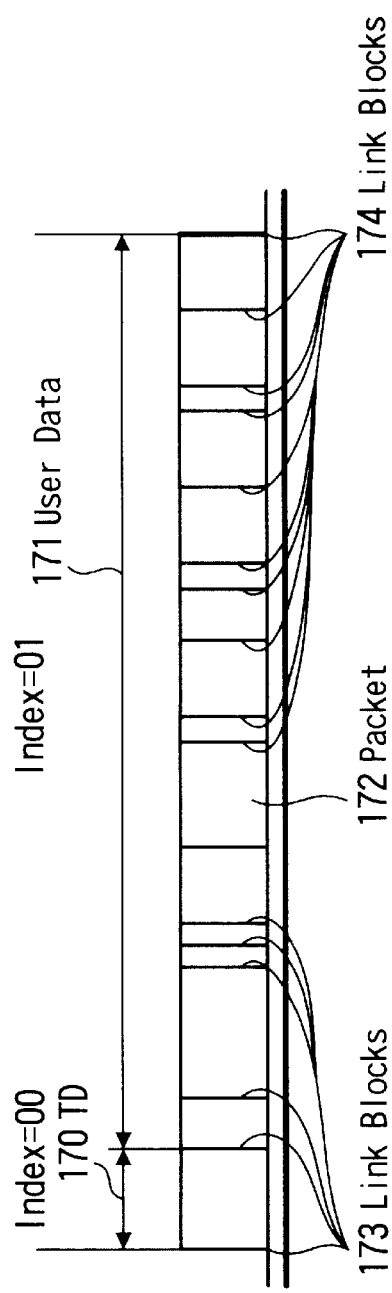
FIG. 4 is an explanatory diagram showing an example of data structure (of a packet by the variable length packet method) on the recording medium according to an embodiment of the present invention.

FIG. 4 shows the data structure of a packet according to the variable length method. An area whose index is "00" is a TD 170. In TD 170 is information indicating that a packet 172 is recorded using the variable length method. An area whose index is "01" is a recording area of user data 171. The packet 172 has an arbitrary number of blocks equal to or more than eight blocks (user data is one block). Link blocks 173 and 174 are buffer zones.

Figure 5:
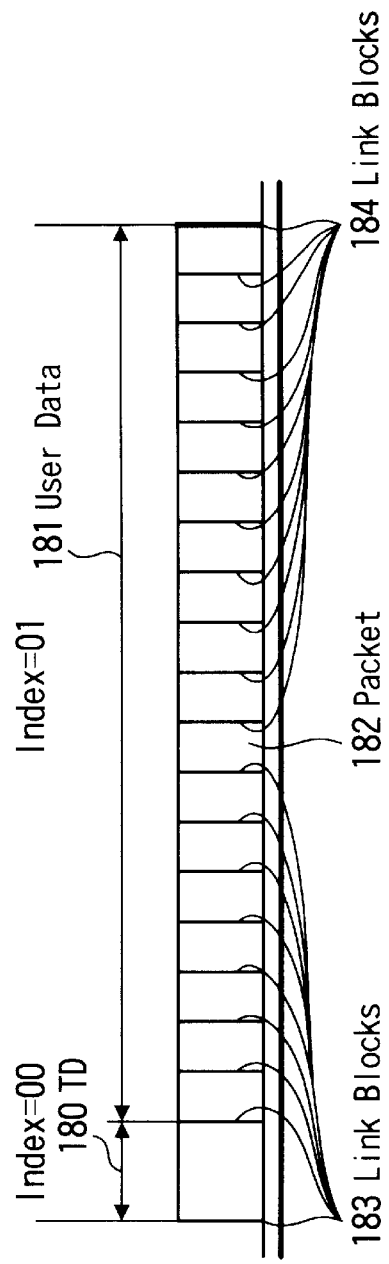
FIG. 5 is an explanatory diagram showing an example of data structure (of a packet by the fixed length packet method) on the recording medium according to an embodiment of the invention.

FIG. 5 shows the data structure of a packet according to the fixed length packet method. An area whose index is "00" is a TD 180. In TD 180 is information indicating that a packet 182 is recorded using the fixed length method, as well as a number of blocks in the packet length. The packet length means the number of blocks of user data within a single packet. An area whose index is "01" is a recording area of user data 181. The user data 181 is comprised of the number of blocks in the packet length which is recorded in the TD 180. Link blocks 183 and 184 are buffer zones.

Figure 6:
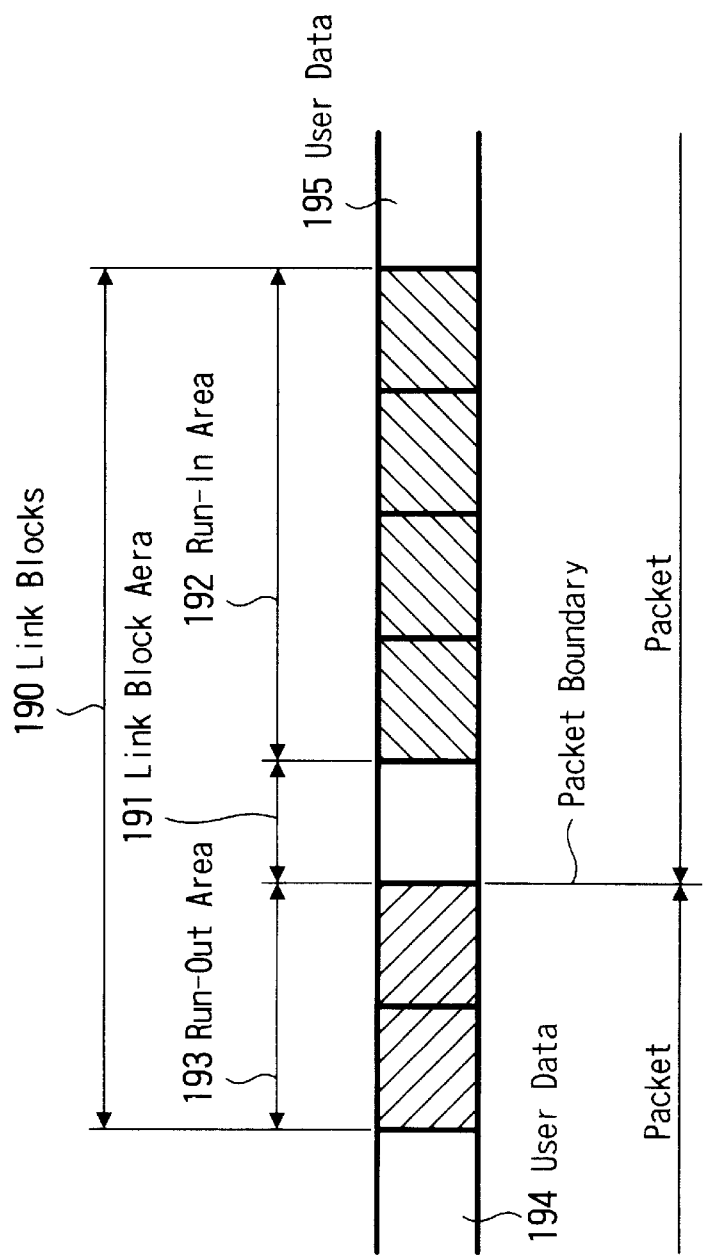
FIG. 6 is an explanatory diagram showing an example of data structure (of link blocks) on the recording medium according to an embodiment of the present invention.

FIG. 6 shows the data structure of link blocks. The link blocks are comprised of seven blocks in total: one block of a link block area 191, four blocks of a run-in area 192 and two blocks of a run-out area 193. The link blocks of the current packet are link block area 191 and run-in area 192, and the link block of the packet immediately before the current packet is run-out area 193.

As concerns the method of recording on the track, any one method of the track-at-once method shown in FIG. 3, the variable length packet method shown in FIG. 4, and the fixed length packet method shown in FIG. 5 can be selected at each track. The selected method is specified in the TD. Moreover, the lead-in area and lead-out area are handled as one track and the recording method on these areas is limited only to the track-at-once method.

For writing once (i.e. for recording additional data within the program area of the CD-R constructed in this manner), there is a track write-once operation in which data is written once by the track unit.

In performing the track write-once operation, data in the PMA area is read out to detect an area where data is not recorded within the program area on the optical disk (i.e. a nonrecorded area), on which nonrecorded area data is written once in a track.

Furthermore, there is a case where data is written once in a packet which is a unit of data smaller than the track unit. The data write-once operation carried out in the packet unit is also called an intra-track write-once operation. In this case, information on the start address and end address of the track is previously recorded in the PMA area so that the track may be formed by an arbitrary number of packets.

However, when the last track is in the open state (that is, the end address of track is not decided), the end address of track is regarded as the last end of user data recordable area of the disk and is not recorded in the PMA. In the intra-track write-once operation, data is continuously recorded in sequence beginning with the first packet in the track. After this data recording operation is interrupted, data is again recorded beginning with an address next to that of the last recorded data.

In the present embodiment, the CD-R having the structure as described above is used for recording billing information. Specifically, a part of the write-once area of the CD-R recording medium on which billing information is recordable (writable once) is defined as the billing information recording area.

The billing information is recorded, for example, using the above described fixed length packet recording method.

First, a data vacant area (nonrecorded area) for billing processing is defined on the disk. Specifically, for example, a predetermined track is reserved (i.e. track information is registered in the PMA area, but in fact the track is not written) and that track is defined as the billing information recording area so that a size of the area for billing processing is fixed. Alternatively, by utilizing the last end of recordable area of the disk, that last end area may be defined as the fixed billing information recording area. However, the billing information recording area need not necessarily be a continuous area on the medium (on the disk).

Suppose now that, for example, eighty thousand blocks of vacant areas are set on the disk for the billing information recording area. These eighty thousand blocks correspond, according to the CD-R format, to an area for recording a digital audio signal in frames for seventeen minutes forty-six seconds and fifty. Assuming that a fixed packet whose packet length is one block is recorded on this area, because the total number of packets is 80000/(1+7)=10000, that area is set as such that ten thousand packets can be recorded. So, if one packet is compared to one billing unit (e.g. if one yen assumes a recorded portion of the billing information recording area to be a spent amount of money and a nonrecorded portion thereof to be the unspent balance), it is possible to process billing of ten thousand yen.

Figure 1:
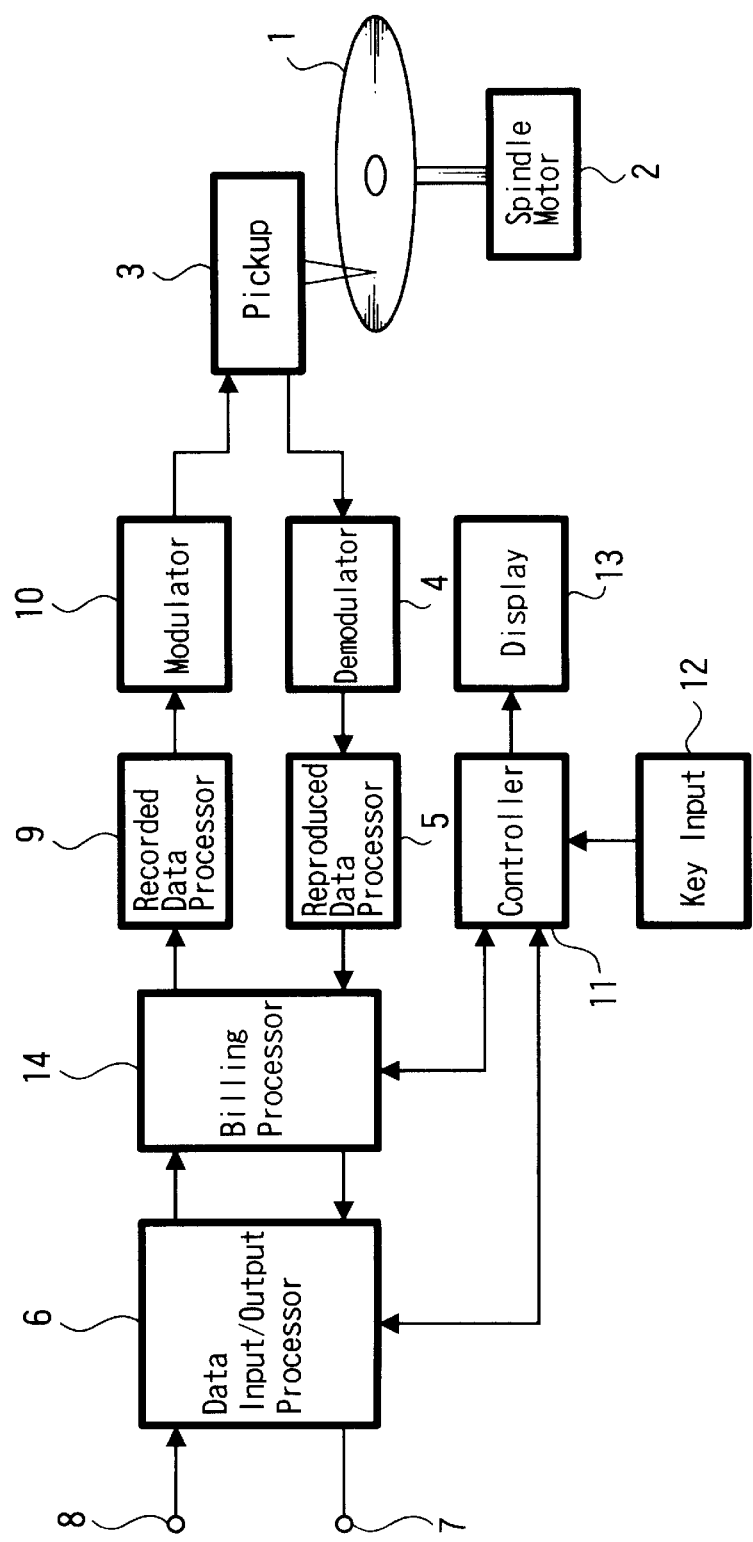
FIG. 1 is a structural diagram showing an example of a recording/reproducing apparatus for the recording medium according to an embodiment of the present invention.

FIG. 1 shows an example of the structure of recording/reproducing apparatus for a CD-R which is provided with the billing information recording area in this way.

A disk (CD-R) 1, in which the billing information recording area is set, is driven to rotate by a spindle motor 2, thus causing an optical pickup 3 to reproduce from each track and record onto each track. The reproduced signal from optical pickup 3 is subjected to demodulation processing by a demodulation processor 4 and is then processed to extract the reproduced data by a reproduced data processor 5. The extracted reproduced data is then processed, output by a data input/output processor 6 from an output terminal 7 in a predetermined format.

Incoming data on an input terminal 8 is determined by data input/output processor 6, and is then processed to be recorded by a recorded data processor 9. The processed data is further processed to be modulated for recording by a modulation processor 10, and the modulated signal is then supplied to optical pickup 3 for recording onto a target track.

In this connection, the reproduction processing and recording processing are arranged to be executed under the control of a controller 11 which is a system controller of this apparatus. To this controller 11 is connected a key input device 12, thus causing the controller 11 to execute processing based on user's key operation. Also, a display device 13 for displaying results processed by the controller 11 is connected thereto, thereby allowing various displays with numerals, characters and the like under the control of controller 11. Furthermore, controller 11 is arranged so that, when the optical disk 1 has a billing information recording area, it can control the billing processing through a billing processor 14 which inputs and outputs specific billing data.

Where the CD-R having a billing information recording area is installed as the optical disk 1 in this recording/reproducing apparatus, optical pickup 3 reproduces information on the billing information recording area under the control of controller 11, and from the recorded state of the billing information recording area the balance established on the optical disk is decided through billing processor 14, thus causing the display device 13 to display the balance, for example. Specifically, controller 11 decides an area set for the billing information recording area through the billing processor 14, and reproduces the billing information recorded in the decided billing information recording area. The billing processor 14 measures the number of blocks recorded in the billing information recording area and decides the balance from the number of blocks to make the display device 13 to display it using the controller 11.

When, for example, the eighty thousand blocks (ten thousand packets) are prepared for the billing information recording area to process billing of ten thousand yen, as described above, if no information is recorded at all in this area, the balance is then determined to be ten thousand yen. If a number of recorded blocks is detected, the balance is then determined to be an amount of money which is obtained by subtracting the number of blocks in yen from ten thousand yen.

When a user confirms an amount of money displayed on the display device 13 and uses key input device 12 to specify an operation to spend some amount of money from the balance, controller 11 controls the billing processor 14 to allow the use of the apparatus for the input amount of money, causes the billing processor 14 to use the number of blocks corresponding to the spent amount of money on the billing information recording area of the optical disk 1 to record the information on the amount of money being spent, and causes the display device 13 to display the balance.

In this case, for example, log information relating to billing utilization is recorded on the billing information recording area. In other words, log information on the billing utilization such as "when, how much, what, and how is it purchased" is recorded. Alternatively, only a fact that the billing of that amount of money is carried out may simply be recorded.

By processing billing in this way, it is possible to process billing using the CD-R as a write-once medium in which the recorded information cannot be erased so as to prevent effectively the wrong (unauthorized) use. Specifically, in the present example, "a size of nonrecorded portion of the billing information recording area" of the disk is equal to "the balance" (or "a size of recorded portion of the billing information recording area" is equal to "the spent amount of money") and so it is impossible to reduce the spent amount of money because the recorded portion cannot be erased physically even if someone tries to falsify the amount of money. Even if someone tries to write something into the billing information recording area by force, only a reduction of the balance (or a loss) will result. In short, it is physically impossible to maliciously falsify the billing information.

By using the recording medium of the present example in this manner, it is possible to provide a billing processing system which enables off-line processing at low cost without any special processing such as enciphering the billing information, making use of the physical property of irreversibility of the recording area of the medium.

In addition, the size (the number of blocks) of the billing information recording area need not correspond directly to an amount of money. Instead, for example, it may be arranged that the spent amount of money (or the balance) is recorded as data (e.g. on the user block of packet in the billing information recording area and then whenever money is spent, the spent amount of money may be sequentially written). Even when processed in this way, because the already recorded portion cannot be erased, it is impossible to falsify the recorded portion. Even though new data in which the spent amount of money is wrongly reduced is written, because all the records remain in the billing information recording area on the medium, checking the records in turn will make it possible to easily detect that unauthorized processing has taken place.

Moreover, when the above described log information is recorded in the billing information recording area, the managing side of the billing system can grasp the use of this system of each user by collecting the log information to analyze it later. Furthermore, by arranging to record such log information (instead of so-called prepaid system in which a payment of a certain amount of money is required when the recording medium is distributed to the user), it is possible to construct a system in which, after money was spent, a settlement of the amount of money is carried out at some stage based on the log information recorded on the billing information recording area of the medium.

In addition, a general weakness of off-line billing systems is when recorded signals in the medium are illegally transferred in their entirety to another cheap medium. However, in case of the write-once recording medium, it is impossible to transfer the signals in their entirety unless the medium is in a completely nonrecorded condition. Even if it is such a nonrecorded medium, by recording special information in advance, only in the medium for billing and circulating it, the above illegal act can also be prevented.

Although, in the above description, the CD-R installed in recording/reproducing apparatus is used only for billing processing, it may be arranged that information on contents forming objects of billing is beforehand recorded on the same recording medium so that the contents and billing information may simultaneously be provided to the user in a single sheet of medium. For example, if enciphered application software is recorded on the first session of the disk, and the second session of the same disk has the billing information recording area, the billing for the application software of the first session can be carried out by using only that disk.

In this case, if a so-called hybrid disk is employed (in which a "read-only portion" of data previously recorded by the so-called stamping process when manufacturing the disk, and a "recordable once portion" used for the billing information recording area are intermingled on the same medium), it will then be possible to both provide the software and bill for using the software. For example, if the first session is formed by the stamping process and the second session is formed as the recordable once portion, it is possible to manufacture it at nearly the same manufacturing cost as an optical disk like a usual CD (compact disk), etc. and make mass production of the disk compatible with secure billing processing.

Although, in the above described mode for carrying out the invention, the billing processing is performed using the optical disk called the CD-R for the recording medium, other recording media may be used. In other words, if a recording medium has at least partially the recordable once area in which recorded data cannot be rewritten, any such recording medium can be used.

Moreover, the recording medium need not be diskform in shape like the aforesaid CD-R. For example, a cardform optical recording medium may be employed.

Additionally, a solid memory such as One Time ROM, in which once recorded data cannot be altered, may also be used for the recording medium.

The present invention is applicable to various billing processing systems to which the recording medium is utilized. It is applicable to various modes of billing. It is applicable not only for billing for the use of pay software of computers, video programs, audio programs, etc. but also for processing to pay an audience fee of a pay channel by providing receivers for various broadcast such as satellite broadcast with a function to record/reproduce on or from the recording medium according to the present embodiment.

Various aspects of the inventive method, recording medium and apparatus include the following.

By using the write-once recording area on the recording medium for the recording area of billing information, no information written into the write-once recording area can be erased physically, thus making difficult the wrong (illegal or unauthorized) use of billing information. Therefore, the off-line billing processing using the recording medium becomes satisfactory, effectively preventing the unauthorized writing of billing information.

Because the billing information is describes a balance by which an amount of money initially set up is reduced, such an unauthorized attempt to increase the balance will be difficult, thus enabling the unauthorized use to be effectively prevented.

Because the billing information recording area is comprised of a predetermined number of blocks and the number of blocks on which the billing information is not yet recorded has a definite relation with the balance, the balance is readily decided. When anyone illegally tries to write information into the billing information recording area, the balance will only be reduced, so as to prevent such illegal use.

Because the recording medium has a contents information recording area in which information on contents forming an object of billing is previously recorded, the billing processing can effectively prevent the wrong use of the billing information recording area provided on the same recording medium. Thus, both the distribution of the content using the recording medium, and the processing to bill for that content, can be carried out satisfactorily.

Because the billing information contains log information on the use of an object of billing, information on conditions of its use is simultaneously recorded, so that a history of the use or the like can be seen from this log information, and at the same time the use conditions can be later analyzed based on the recorded log information, thus allowing illegal use to be prevented more effectively.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A recording medium having a write-once recording area in which information can be recorded only a single time and cannot be rewritten at locations on which information has already been recorded, the recording medium comprising:

a billing information recording area in which readable billing information is sequentially recorded in the write-once recording area in a series of packets of a single fixed length, each packet representing an indivisible billing unit, so that the billing information recording area includes:
  a) a recorded portion in which the readable billing information has been recorded so as to occupy a first number of packets and a corresponding first area of the billing information recording area that are directly proportional to a spent number of billing units; and
  b) an unrecorded portion in which the readable billing information is not presently recorded and that occupies a second number of packets and a corresponding second area of the billing information recording area that are directly proportional to an unspent balance of billing units.

2. The recording medium of claim 1, wherein the billing information that is sequentially recorded in the write-once recording area includes:

information on a balance that is reduced from an initial amount of billing units to the unspent balance of billing units.

3. The recording medium of claim 1, further comprising:
a contents information recording area on which contents information is recorded, the contents information constituting an object of billing of the billing information.

4. The recording medium of claim 3, wherein the object of billing includes:
software that is configured to be used by a customer and whose use is billed by using the billing information that is sequentially recorded in the write-once recording area of the same recording medium on which the software is written.

5. The recording medium of claim 1, wherein the billing information includes: log information on use of an object of billing.

6. A recording method for recording billing information on the recording medium of claim 1, the method comprising:
recording the billing information in the previously unrecorded portion of the billing information recording area of the recording medium, so as to increase the first area and reduce the second area.

7. The recording method of claim 6, wherein the billing information that is sequentially recorded in the write-once recording area includes:

information on a balance that is reduced from an initial amount of billing units to the unspent balance of billing units.

8. The recording method of claim 6, further comprising:

recording contents information into a contents information recording area, the contents information constituting an object of billing of the billing information.

9. The recording method of claim 8, wherein:

the object of billing includes software that is configured to be used by a customer; and the recording method further comprises billing for use of the software by using the billing information that is sequentially recorded in the write-once recording area of the same recording medium on which the software is written.

10. The recording method of claim 6, wherein the step of recording the billing information includes:

recording log information on use of an object of billing into the billing information recording area.

11. A recording apparatus for recording billing information on the recording medium of claim 1, the apparatus comprising:

a billing information recording portion configured to record the billing information in the previously unrecorded portion of the billing information recording area of the recording medium, so as to increase the first area and reduce the second area.

12. The recording apparatus of claim 11, wherein the billing information that is sequentially recorded in the write-once recording area includes:

information on a balance that is reduced from an initial amount of billing units to the unspent balance of billing units.

13. The recording apparatus of claim 11, wherein the billing information recording portion includes:

a log information recording portion configured to record log information on use of an object of billing.

14. The recording apparatus of claim 11, further comprising:

a contents information recording portion configured to record contents information into a contents information recording area, the contents information constituting an object of billing of the billing information.

15. The recording apparatus of claim 14, wherein:

the object of billing includes software that is configured to be used by a customer; and the recording apparatus further comprises a billing portion configured to bill for use of the software by using the billing information that is sequentially recorded in the write-once recording area of the same recording medium on which the software is written.

* * * * *